US005455855A

United States Patent [19]
Hokari

[11] Patent Number: 5,455,855
[45] Date of Patent: Oct. 3, 1995

[54] SYSTEM FOR CONNECTING PUBLIC NETWORK SUBSCRIBER AND PRIVATE NETWORK SUBSCRIBER

[75] Inventor: Makoto Hokari, Tokyo, Japan

[73] Assignee: NEC Corporation, Tokyo, Japan

[21] Appl. No.: 195,083

[22] Filed: Feb. 14, 1994

[30] Foreign Application Priority Data

Feb. 12, 1993 [JP] Japan .................................. 5-024101

[51] Int. Cl.$^6$ ...................................... H04M 3/54
[52] U.S. Cl. .................... 379/229; 379/220; 379/221; 379/211; 379/196; 379/198; 379/207; 379/225
[58] Field of Search ...................................... 379/207, 198, 379/196, 189, 220, 221, 225, 210, 211, 212, 229

[56] References Cited

U.S. PATENT DOCUMENTS

| | | | |
|---|---|---|---|
| 4,594,477 | 6/1986 | Noirot | 379/225 |
| 4,661,974 | 4/1987 | Bales et al. | 379/225 |
| 5,099,511 | 3/1992 | Matsumoto | 379/198 |
| 5,212,691 | 5/1993 | Hokari | 379/221 |
| 5,233,648 | 8/1993 | Nakamura | 379/211 |
| 5,339,356 | 8/1994 | Ishii | 379/225 |

FOREIGN PATENT DOCUMENTS 64-86642  3/1989  Japan .

Primary Examiner—James L. Dwyer
Assistant Examiner—Parag Dharia
Attorney, Agent, or Firm—Foley & Lardner

[57] ABSTRACT

A connection system of a public network subscriber and a private network subscriber in ISDN includes a first PBX for connecting the public network subscriber and the public network, a second PBX for the private network subscriber and the private network, and third PBXs for connecting the public line and the private line. The first PBX selects one of the third PBXs as an access point to the private network, and forms a first set-up message having the public line number of the selected access point as a destination, the received private line number as a sub-address, and the public line number of the public network subscriber as a calling party identification. The second PBX selects one of the third PBXs as an access point to the public network, and forms a second set-up message having the private line number of the selected access point as a destination, the received public line number as a sub-address, and the private line number of the private network subscriber as a calling party number. Each of the third PBXs previously stores the identification numbers permitted access to the private network and the public network. Only when the calling party number of the received set-up message is identical to one of the identification numbers, the connection is permitted between the public line and the private line.

15 Claims, 6 Drawing Sheets

FIG.4

| DESTINATION NUMBER | 03-3210-1111 |
|---|---|
| DESTINATION SUB-ADDRESS | 8-10-2000 |
| CALLING PARTY NUMBER | 03-3210-2222 |

| DESTINATION NUMBER | 8-11-5000 |
|---|---|
| DESTINATION SUB-ADDRESS | 03-3210-2222 |
| CALLING PARTY NUMBER | 8-10-2000 |

701

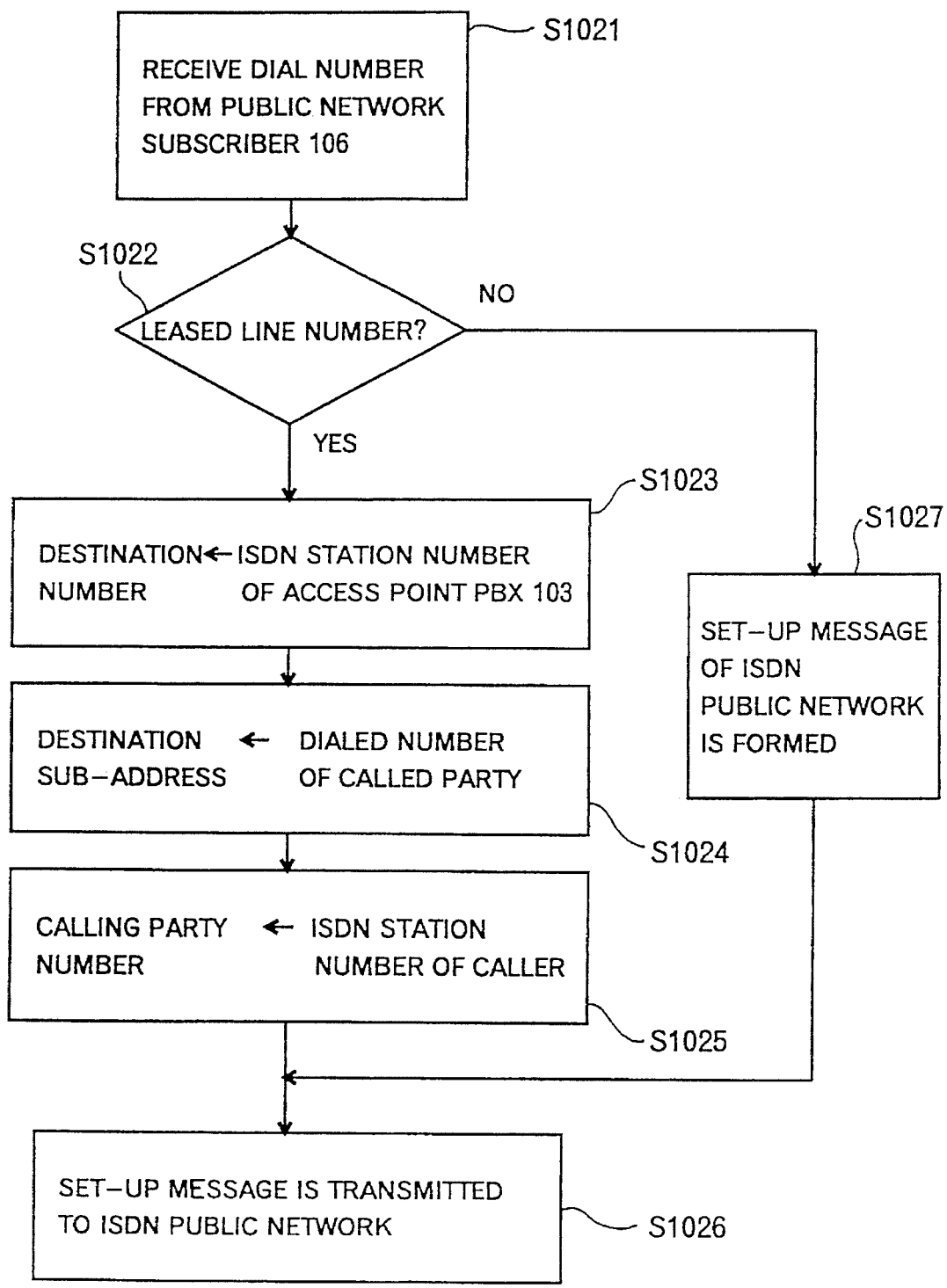

SYSTEM FOR CONNECTING PUBLIC NETWORK SUBSCRIBER AND PRIVATE NETWORK SUBSCRIBER

FIELD OF THE INVENTION

The present invention relates to a system for connecting a public network and a private network, and more particularly, to a connection system of a public network and a private network by using exchanges to enable communication between a public network subscriber and a private network subscriber.

BACKGROUND OF THE INVENTION

A private network is a closed communication network provided for carrying out communications between specified users, including a leased line network, a virtual private network, and the like. A number of leased line networks, such as government office networks and enterprise networks, are in use at present. Economical use of a communication network, provision of various communication services, flexibility of servicing, etc., can be easily realized by constructing such a private network.

In a private network, assurance of security becomes an important point, but if a private network is connected with a public network, services can be provided to a number of subscribers without being limited to specific areas. A variety of systems for connecting a public line and a private line have been proposed.

An additional dialing system is one of the conventional systems for connecting a public network subscriber and a leased line network subscriber. For example, when a public network subscriber originates a call and a private branch exchange (PBX), which becomes an access point to a private network, responds to the call incoming, this subscriber additionally dials an authorization code, which is equivalent to a password, to the PBX. The incoming call is authorized by the authorization code. Then, the leased line number of a called party is further additionally dialed, thereby allowing connection to a leased line network subscriber.

However, in this additional dialing system, the calling party has to dial a number of digits and carry out very complicated originating procedures. Moreover, there is a fear of abuse of the authorization code if its number is known by other people. There is a problem in that complete security cannot be secured.

In another conventional system, a dial number transmitting system uses a data terminal having a restriction on the number of dial digits that can be transmitted automatically, which makes the public network—leased line network—public network connection possible (Refer to Japanese patent unexamined publication No. 64-86642.) In this dial number transmitting system, the network control unit (NCU) connected with a data terminal previously stores the identification number of the data terminal and the public network subscriber's number of the nearest PBX which becomes an access point to a leased line network, the PBX having an additional number dial-in function, which can directly call an extension. On receipt of a called party selecting dial number from the data terminal of a calling party, which is necessary for connection with a leased line network and a public network, the NCU selects the nearest PBX and a data call is established through the leased line network and the public network.

In such a dial number transmitting system, however, the security of the leased line network is not taken into account at all because the leased line is regarded as a mere transmission line. Furthermore, the calling party has to dial a called party selecting dial number, which is necessary for connection with a leased line network and a public network. Therefore, the dialing operation is complicated.

An object of the present invention is to provide a connection system of a public network subscriber and a private network subscriber, which can improve the subscriber's operability, and ensure complete security.

SUMMARY OF THE INVENTION

A system for connecting a public network subscriber and a private network subscriber in ISDN to make communications possible between them, is comprised of a first exchange for connecting the public network subscriber and the public network, a second exchange for the private network subscriber and the private network, and a plurality of third exchanges for connecting a public line of the public network and a private line of the private network.

The first exchange selects one of the third exchanges as an access point to the private network when receiving a private line number of the private network subscriber from the public network subscriber, and forms a first set-up message to be transmitted to the public network. The first set-up message includes a destination number, a destination sub-address, and a calling party number, the destination number comprising a public line number of the selected access point, the destination sub-address comprising the private line number received from the public network subscriber, and the calling party number comprising the public line number of the public network subscriber.

The second exchange selects one of the third exchanges as an access point to the public network when receiving the public line number of the public network subscriber from the private network subscriber, and forms a second set-up message to be transmitted to the private network. The second set-up message includes a destination number, a destination sub-address, and a calling party number, the destination number comprising the private line number of the selected access point, the destination sub-address comprising the public line number of the public network subscriber received from the private network subscriber, and the calling party number comprising the private line number of the private network subscriber.

Each of the third exchanges previously stores identification numbers which is comprised of registered public line numbers of the public network subscribers permitted access to the private network and registered private line numbers of the private network subscribers permitted access to the public network through the private network. It is decided whether the calling party number read out from a received set-up message of the first and the second set-up messages is identical to one of the identification numbers. Only when the calling party number is identical to one of the identification numbers, the connection is permitted between the public line and the private line.

The first exchange preferably includes a first conversion table storing the public line number of the third exchange as the access point nearest to the first exchange. The second exchange preferably includes a second conversion table storing the private line number of the third exchange as the access point nearest to the first exchange connected to the public network subscriber of the called party.

The private network is preferably a virtual private network, a leased line network, or the like constructed in an ISDN network. However, the private network is not necessary to be constructed in ISDN when connection is made from the public network subscriber to the private network subscriber.

BRIEF DESCRIPTION OF THE DRAWINGS

FIG. 4 is a schematic diagram showing the structure of a setup message to be formed in cases of connection from a public line to a leased line in the embodiment;

FIG. 5 is a control flowchart of the private branch exchange 102 in the embodiment.

FIG. 7 is a schematic diagram showing the structure of a setup message to be formed in cases of connection from a leased line to a public line in the embodiment.

DETAILED DESCRIPTION OF THE PREFERRED EMBODIMENTS

Figure 1:
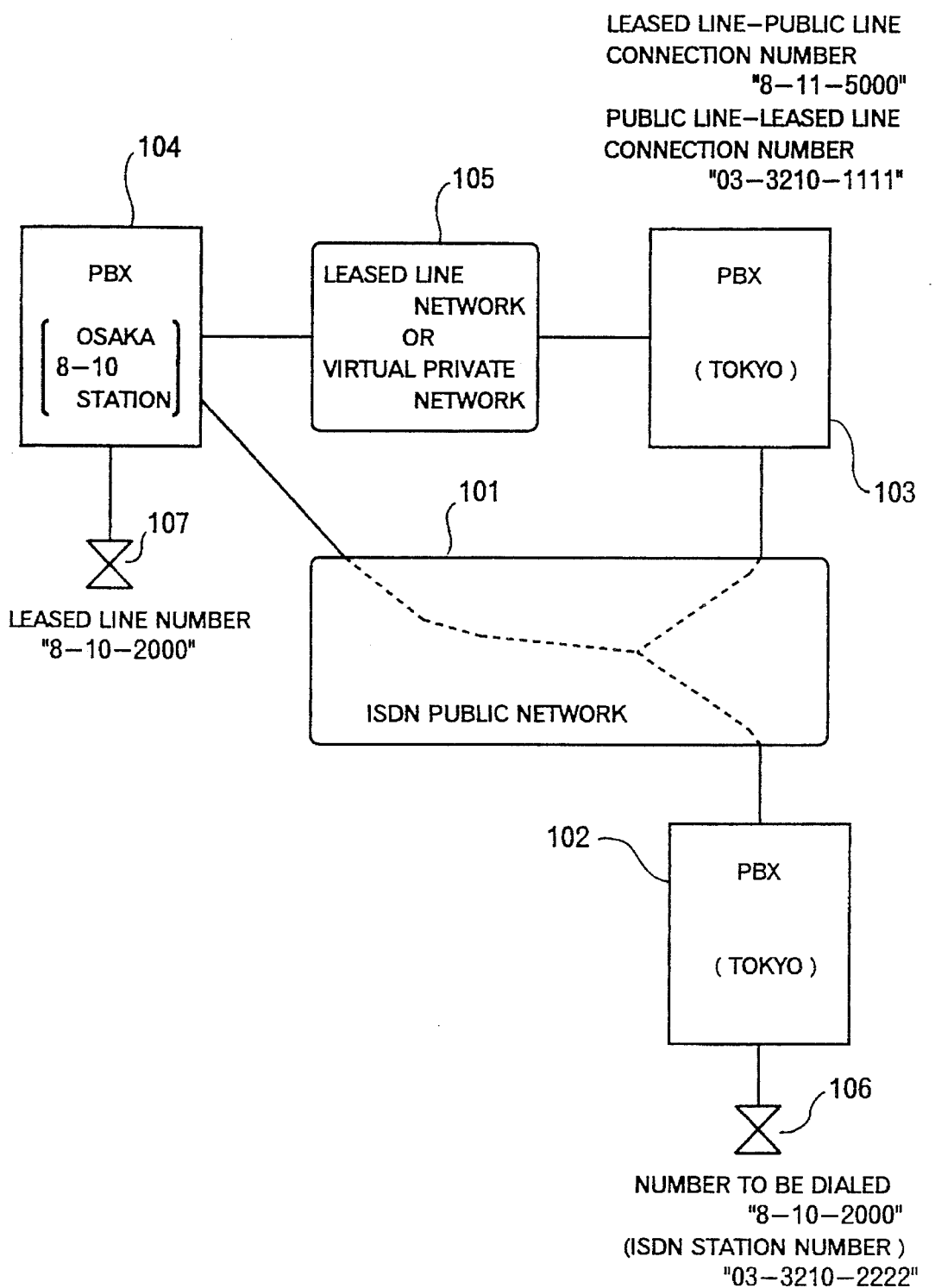
FIG. 1 is a schematic block diagram illustrating an embodiment of a public line—leased line connection system according to the present invention.

As an example, consider a communication network as shown in FIG. 1. The private branch exchanges (PBXs) 102–104 are connected with the public network of the Integrated Services Digital Network (ISDN) 101. Of them, the PBXs 103 and 104 are also connected with a leased line network or virtual private network 105. The leased line network 105 may be a privately owned network or a software defined network (SDN). The PBXs 102 and 103 are located in Tokyo and the PBX 104 is located in Osaka. The ISDN numbers "03-3210-2222" and "03-3210-1111" are assigned to the PBXs 102 and 103, respectively. Furthermore, in the leased line network 105, the leased line numbers "8-11-5000" and "8-10-2000" are assigned to the PBXs 103 and 104, respectively.

Figure 2:
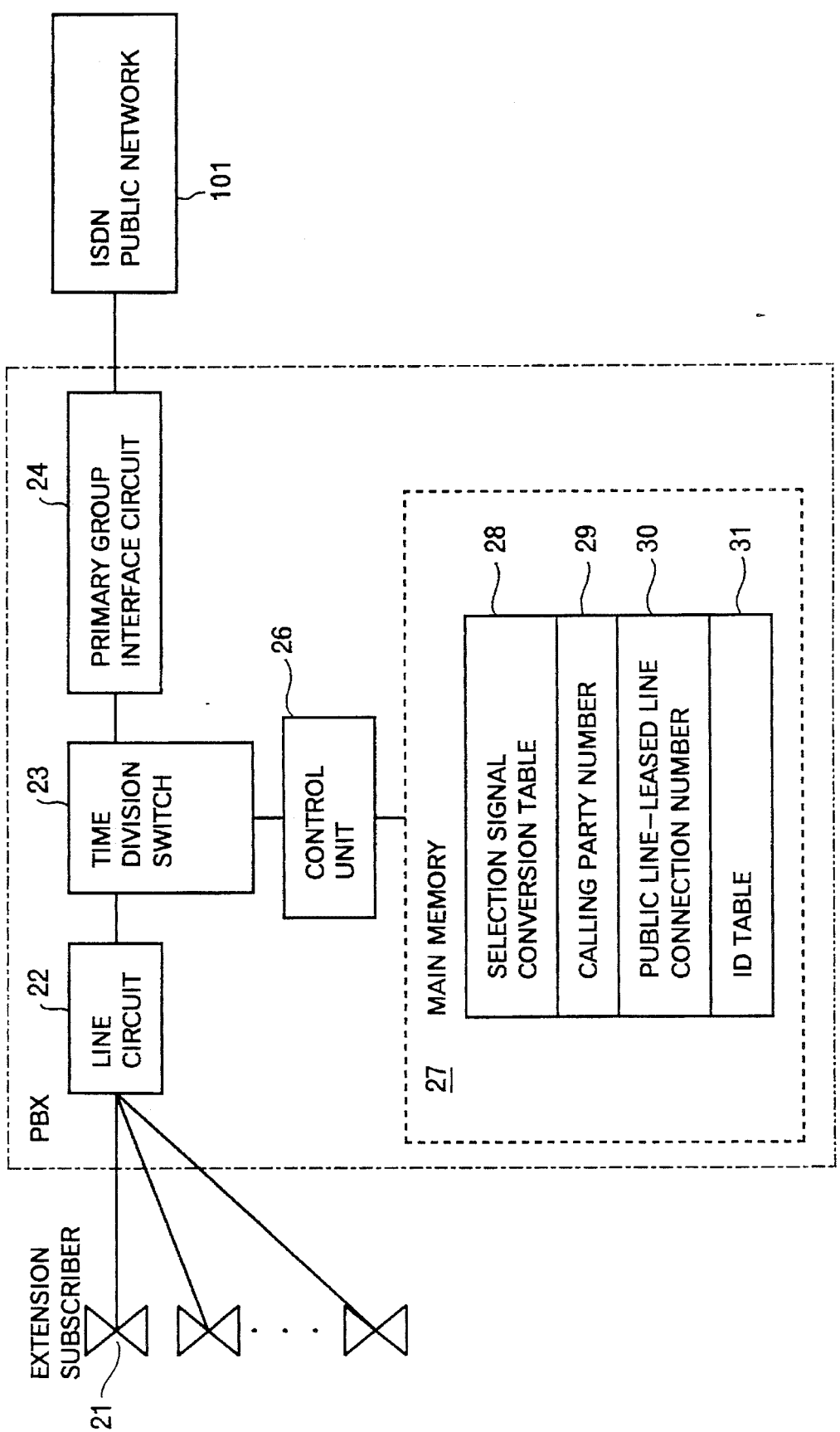
FIG. 2 is a block diagram of a private branch exchange used in the present embodiment.

Each of the PBXs 102–104, as shown in FIG. 2, has a line circuit 22, time division switch 23, primary rate interface circuit (ISDN trunk circuit) 24, control unit 26, and main memory 27. A plurality of extension subscribers 21 are connected with the time division switch 23 through the line circuit 22.

The time division switch 23 performs a path control between the line circuit 22 and the primary rate interface circuit 24 under control of the control unit 26. In this way, an extension subscriber and the ISDN public network 101 are connected with each other. Moreover, each time division switch 23 of the PBXs 103 and 104 is also connected with the leased line network 105 through a leased line circuit (indicated by broken lines in FIG. 2).

The main memory 27 stores information necessary for the operation of the embodiment and other information necessary for exchange control. The information needed for the embodiment is the selection signal conversion table 28 for storing the address signal of the PBX predetermined as an access point, the calling party number 29 for indicating the call originating of the dial number received, the public line—leased line connection number 30, as well as the identification (ID) table 31 for storing the registered numbers permitting a public line—leased line connection. The public line—leased line connection number 30 indicates the ISDN number and/or the leased line number of the relevant PBX, which are used to make a public line—leased line connection.

Figure 3:
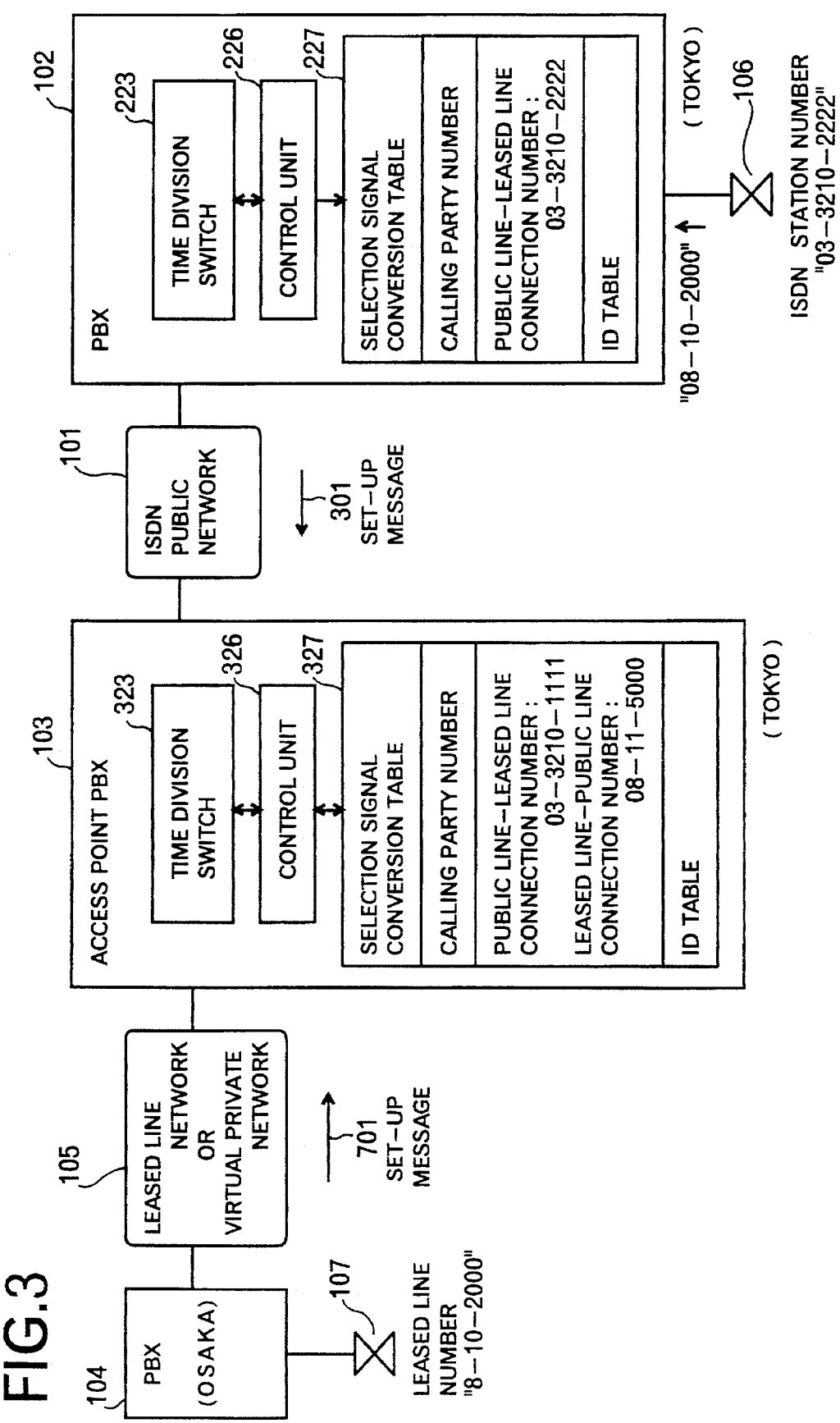
FIG. 3 is a block diagram for explaining the operation of the embodiment.

Next, the operation of the embodiment will be explained according to the flowcharts in FIGS. 5 and 6, occasionally referring to FIGS. 3, 4 and 7. The following explains how a public line and a leased line are connected in cases where the public network subscriber 106 is a calling party and the leased line network subscriber 107 is a called party.

First, FIG. 5 shows a control flow of the PBX 102. When a dial number is received from the public network subscriber 106 (S1021), the PBX 102 decides whether the dial number is a leased line number or not (S1022). If the dial number received is a leased line number (YES of S1022), a set-up message 301 for the public line—leased line connection is formed (S1023–S1025). If it is an ISDN public network number (NO of S1022), a set-up message of the ISDN public network is formed (S1027). Such a setup message formed in this way is transmitted from the PBX 102 to the ISDN public network 101 (S1026).

Suppose that, when the top number of the dial number is "8", the dial number is a leased line number, and when it is other than "8", the dial number is an ISDN public network number. And further suppose that the public network subscriber 106 dials the number "8-10-2000" of the leased line network subscriber 107 where the dial number "8" is a special service code, the dial number "10" is a leased line number, and the dial number "2000" is an extension number.

Therefore, on receipt of the dial number "8-10-2000", the PBX 102 decides that it is a leased line number (YES of S1022), and forms the set-up message for the public line—leased line connection, as mentioned bellow (S1023–S1025).

The control unit 226 of the PBX 102 selects the nearest PBX 103 as an access point to the leased line network 105 by referring to the selection signal conversion table of the main memory 227, and sets the destination number of the set-up message 301 at the ISDN number "03-3210-1111" of the PBX 103 (S1023). Furthermore, the control unit 226 sets the destination sub-address at the dialed number "8-10-2000" of the called party (S1024), and the number of the calling party at the ISDN number "03-3210-2222" of the calling party 106 (S1025). Such a set-up message 301 for the public line—leased line connection is sent to the ISDN public network 101 (S1026). FIG. 4 shows the set-up message 301.

Figure 6:
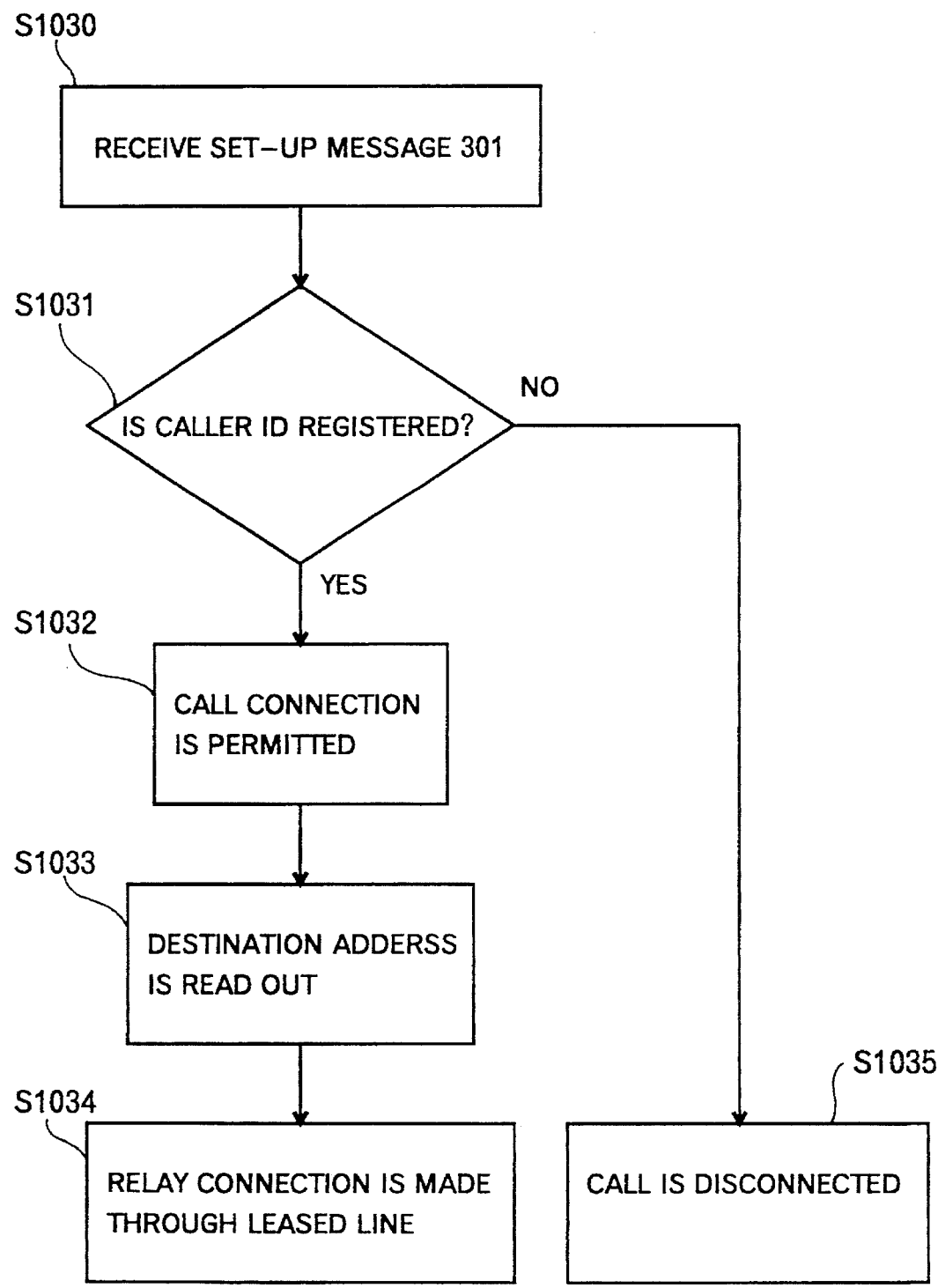
FIG. 6 is a control flowchart of the private branch exchange 103 in the embodiment.

Then, as shown in FIG. 6, the PBX 103 which becomes an access point receives the set-up message 301 having the destination number which is identical to the stored public line—leased line connection number "03-3210-1111" from the ISDN public network 101 (S1030). The access point PBX 103 decides whether the calling party number "03-3210-2222" of the calling subscriber 106 is registered in the ID table of the main memory 327 (S1031). If it is registered (YES of S1031), the connection of the call is permitted (S1032) and the leased line number "8-10-2000" is read out from the destination sub-address of the set-up message (S1033). Then, a new set-up message having this leased line number as a destination number is formed and sent to the leased line network 105 to connect the call. The transit connection is made between the calling party 106 and the called party 107 through the ISDN public network 101 and the leased line network 105 (S1034).

On the other hand, if the calling party 106 is not registered in the ID table of the PBX 103 (NO of S1031), the connection of the call is not permitted and the call is disconnected (S1035). Therefore, only specific calling subscribers can access to the leased line network 105 without dialing a special ID code, and the security of the leased line network 105 can be maintained.

The connection from a public network 101 to a leased line network 105 was explained above, but, contrary to this, the connection from a leased line network 105 to a public network 101 can also be made in a similar manner. In this case, the leased line network subscriber 107 is a calling party and the public network subscriber 106 is a called party.

First, when the calling party 107 selects a leased line and dials the ISDN number "03-3210-2222" of the called party 106, the PBX 104 selects the PBX 103 as an access point to the public network 101, and forms a set-up message 701 for the leased line—public line connection as shown in FIG. 7. The control procedure of this PBX 104 is similar to the control flow shown in FIG. 5.

When the access point PBX 103 receives the set-up message 701 having the destination number which is identical to the stored leased line—public line connection number "8-11-5000", it decides whether the calling party number (here, "8-10-2000") is registered in the ID table thereof. That is, it is set such that only the specific calling subscribers permitted can go out from the leased line network 105 to the public network 101. If the calling party number is registered in the ID table of the access point PBX 103, the ISDN number "03-3210-2222" of the called party 106 is read out from the destination sub-address, a new set-up message having that number as a destination number is formed, and a call is established between the calling party 107 and the called party 106.

As explained in detail above, in the connection system between a public network subscriber and a leased line network subscriber, the public line and the leased line are connected only by a calling party dialing the identification number of a called party, and the call between them is established. Therefore, the operability of each subscriber is improved considerably and the connection time is shortened as well. Furthermore, since whether the calling party is a connection permitted subscriber or not is automatically decided using the calling party number, complete security can be maintained.

What is claimed is:

1. In a system for connecting a public network and a private network in Integrated Services Digital Network (ISDN) to make communications possible between a public network subscriber and a private network subscriber, comprising:

a first exchange for connecting said public network subscriber and said public network, a second exchange for connecting said private network subscriber and said private network, and a plurality of third exchanges for connecting said public network and said private network, said first exchange comprising:

first selecting means for selecting one of said third exchanges as an access point to said private network when receiving a private line number of said private network subscriber from said public network subscriber; and first set-up forming means for forming a first set-up message to be transmitted to said public network, said first set-up message including a destination number, a destination sub-address, and a calling party number, said destination number comprising the public line number of said access point selected by said first selecting means, said destination sub-address comprising said private line number received from said public network subscriber, and said calling party number comprising the public line number of said public network subscriber, said second exchange comprising:

second selecting means for selecting one of said third exchanges as an access point to said public network when receiving the public line number of said public network subscriber from said private network subscriber; and second set-up forming means for forming a second set-up message to be transmitted to said private network, said second set-up message including a destination number, a destination sub-address, and a calling party number, said destination number comprising the private line number of said access point selected by said second selecting means, said destination sub-address comprising said public line number of said public network subscriber received from said private network subscriber, and said calling party number comprising the private line number of said private network subscriber, and each of said third exchanges comprising:

storage means for storing the identification numbers registered previously, said identification numbers comprising registered public line numbers of said public network subscribers permitted access to said private network and registered private line numbers of said private network subscribers permitted access to said public network through said private network;

decision means for deciding whether said calling party number read out from a received set-up message of said first and said second set-up messages is identical to one of said identification numbers; and connection permitting means for permitting connection between said public network and said private network only when said decision means decides that said calling party number is identical to one of said identification numbers.

2. The system as set forth in claim 1, wherein:

said first selecting means of said first exchange includes a first conversion table storing the public line number of the third exchange as said access point nearest to said first exchange; and said second selecting means of said second exchange includes a second conversion table storing the private line number of the third exchange as said access point nearest to said first exchange associated with said public network subscriber of called party.

3. The system as set forth in claim 1, wherein each of said third exchanges is assigned a public line number of said public network as a connection number for connection from said public network to said private network, and is also assigned a private line number of said private network as a connection number for connection from said private line to said public line.

4. The system as set forth in claim 1, wherein said private network is comprised of a virtual private network constructed in an ISDN public network.

5. The system as set forth in claim 1, wherein said private network is comprised of a leased line network constructed in an ISDN network.

6. In a system for connecting from a public network in Integrated Services Digital Network (ISDN) to a private network to make communications possible between a public network subscriber and a private network subscriber, comprising:

a first exchange for connecting said public network subscriber and said public network, a second exchange for connecting said private network subscriber and said private network, and a plurality of third exchanges for connecting a public line of said public network and a private line of said private network, said first exchange comprising:

selecting means for selecting one of said third exchanges as an access point to said private network when receiving the private line number of said private network subscriber from said public network subscriber; and set-up forming means for forming a set-up message to be transmitted to said public network, said set-up message including a destination number, a destination sub-address, and a calling party number, said destination number comprising the public line number of said access point selected by said selecting means, said destination sub-address comprising said private line number received from said public network subscriber, and said calling party number comprising the public line number of said public network subscriber, and said selected access point of said third exchanges comprising:

storage means for storing identification numbers registered previously, said identification numbers comprising registered public line numbers of said public network subscribers permitted access to said private network;

decision means for deciding whether said calling party number read out from said received set-up message is identical to one of said identification numbers; and connection permitting means for permitting connection between said public line and said private line only when said decision means decides that said calling party number is identical to one of said identification numbers.

7. The system as set forth in claim 6, wherein: said selecting means of said first exchange includes a conversion table storing the public line number of the third exchange as said access point nearest to said first exchange.

8. The system as set forth in claim 6, wherein each of said third exchanges is assigned a public line number of said public network as a connection number for connection from said public network to said private network.

9. The system as set forth in claim 6, wherein said private network is comprised of a virtual private network constructed in an ISDN public network.

10. The system as set forth in claim 6, wherein said private network is comprised of a leased line network constructed in an ISDN network.

11. In a system for connecting from a private line to a public line in Integrated Service Digital Network (ISDN) to make communications possible between a public network subscriber and a private network subscriber, comprising:

a first exchange for connecting said public network subscriber and said public network, a second exchange for connecting said private network subscriber and said private network, and a plurality of third exchanges for connecting said public line and said private line, said second exchange comprising:

selecting means for selecting one of said third exchanges as an access point to said public network when receiving a public line number of said public network subscriber from said private network subscriber; and set-up forming means for forming a set-up message to be transmitted to said private network, said set-up message including a destination number, a destination sub-address, and a calling party number, said destination number comprising the private line number of said access point selected by said selecting means, said destination sub-address comprising said public line number of said public network subscriber received from said private network subscriber, and said calling party number comprising a private line number of said private network subscriber, and said selected access point of said third exchanges comprising:

storage means for storing identification numbers registered previously, said identification numbers comprising registered private line numbers of said private network subscribers permitted access to said public network through said private network;

decision means for deciding whether said calling party number read out form said received set-up message is identical to one of said identification numbers; and connection permitting means for permitting connection from said private line to said public line only when said decision means decides that said calling party number is identical to one of said identification numbers.

12. The system as set forth in claim 11, wherein:

said selecting means of said second exchange includes a conversion table storing the private line number of the third exchange as said access point nearest to said first exchange associated with said public network subscriber of called party.

13. The system as set forth in claim 11, wherein each of said third exchanges is assigned a private line number of said private network as a connection number for connection from said private network to said public network.

14. The system as set forth in claim 11, wherein said private network is comprised of a virtual private network constructed in an ISDN public network.

15. The system as set forth in claim 11, wherein said private network is comprised of a leased line network constructed in an ISDN network.

* * * * *